(12) United States Patent
Bauer

(10) Patent No.: US 7,002,111 B2
(45) Date of Patent: Feb. 21, 2006

(54) ELECTRIC WARMER WITH A CURRENT SENSOR

(75) Inventor: Hans-Peter Bauer, Klingenmuenster (DE)

(73) Assignee: DBK David & Baader GmbH, Kandel (DE)

(*) Notice: Subject to any disclaimer, the term of this patent is extended or adjusted under 35 U.S.C. 154(b) by 0 days.

(21) Appl. No.: 11/081,795

(22) Filed: Mar. 16, 2005

(65) Prior Publication Data

US 2005/0205546 A1    Sep. 22, 2005

(30) Foreign Application Priority Data

Mar. 19, 2004  (EP) .................................. 04006721

(51) Int. Cl.
  *H05B 1/02*   (2006.01)
  *A47J 36/24*  (2006.01)
  *B01D 1/00*   (2006.01)

(52) U.S. Cl. .................. 219/480; 219/432; 219/435; 219/441; 219/497; 219/504; 422/285

(58) Field of Classification Search ................. None
  See application file for complete search history.

(56) References Cited

U.S. PATENT DOCUMENTS

| | | | |
|---|---|---|---|
| 3,187,164 A |   | 6/1965 | Andrich |
| 3,347,618 A |   | 10/1967 | McKeown |
| 3,375,774 A | * | 4/1968 | Fujimura et al. ............. 99/281 |
| 3,584,196 A | * | 6/1971 | Kurokawa et al. .......... 219/435 |
| 4,177,375 A | * | 12/1979 | Meixner ...................... 219/441 |
| 4,716,278 A |   | 12/1987 | Cappe et al. |
| 4,759,189 A |   | 7/1988 | Stropkay et al. |
| 5,773,795 A |   | 6/1998 | Messmer |
| 6,222,989 B1 |   | 4/2001 | Lee |
| 6,661,967 B1 |   | 12/2003 | Levine et al. |
| 2004/0069769 A1 | * | 4/2004 | Carr ........................... 219/497 |

FOREIGN PATENT DOCUMENTS

| | | |
|---|---|---|
| DE | 10214905 | 12/2003 |
| FR | 1513453 | 2/1968 |

* cited by examiner

*Primary Examiner*—Joseph M Pelham
(74) *Attorney, Agent, or Firm*—Michael Best & Friedrich LLP

(57) ABSTRACT

The present invention relates to an electric warmer for heating a container by means of a heat transfer medium. The warmer comprises a jar into which the container can be inserted for heating, and an electric heating device comprising at least one resistance heating element for heating the heat transfer medium. To indicate an improved electric warmer of the above-mentioned type in which power can be supplied in a particularly efficient manner while the control device can be configured at particularly low costs at the same time, the warmer comprises a sensor element for measuring the current flowing through the resistance heating element during operation of the heating device, and a control unit configured in such a manner that it detects a typical change in the current flowing through the resistance heating element due to a change in the state of aggregation of the medium to be heated, and controls power supply to the resistance heating element in dependence upon the state of aggregation of the medium to be heated.

12 Claims, 4 Drawing Sheets

ELECTRIC WARMER WITH A CURRENT SENSOR

FIELD OF THE INVENTION

The present invention relates to an electric warmer for heating a container by means of a heat transfer medium, and in particular, to a warmer that comprises a jar into which the container can be inserted for heating, and an electric heating device comprising at least one resistance heating element for heating the heat transfer medium.

BACKGROUND OF THE INVENTION

Presently, vaporization of water in an electric warmer is needed in so-called vaporizers, i.e. in sterilizers, for instance for baby bottles. The power supply in such devices is most of the time monitored and controlled via temperature monitoring, as is e.g. shown in U.S. Pat. No. 4,716,278. In this process, however, heating power may unnecessarily be supplied if heating is continued when the whole amount of water has already evaporated.

A further known arrangement of a sterilizer is shown in U.S. Pat. No. 3,347,618. In this sterilizer, the heating power is switched off directly after vaporization of the whole water reservoir for the reason that heating is carried out via open electrodes and current flows directly through the filled-in water. This solution, however, has significant drawbacks in terms of safety.

Furthermore, such electric warmers are often used for heating baby food contained in a container. Apart from heating baby food in a water bath, it is also known that baby food is heated by means of water vapor as the heat transfer medium. An electric baby food warmer with water vapor is e.g. known from DE 102 14 905 C1. The advantage of this solution is that only a very small amount of water must be evaporated and that due to the high temperature and the evaporation enthalpy of the water vapor the baby food can be heated rapidly while saving energy. After the heating power supply has been interrupted, the small amount of water cools relatively rapidly, thereby falling below the boiling point, and heat is no longer transferred to the food container. As a result, an overheating of the baby food to be heated can be avoided. In the known baby food warmers of the above-indicated type, power control is however carried out via a timer which switches off the power supply after an adjustable heating time has been reached. The timer has the function to ensure a defined temperature of the food to be heated, also in the case of varying food amounts and food temperatures, but always requires the same amount of liquid for a perfect function. This is difficult in the case of comparatively small volumes because small amounts of water (e.g. 10 ml to 20 ml) can most of the time not be filled with adequate accuracy with the measuring methods that are standard in the household sector. Therefore, such a timer provides a power control solution which can be handled particularly easily and at low costs.

If, as an alternative, a thermostat is used for controlling the heating power supply in said warmers, this has the drawback that control and temperature measurement are very complicated.

SUMMARY OF THE INVENTION

An improved electric warmer of the above-mentioned type is provided wherein power can be supplied in a particularly efficient manner while the control device may be fabricated at particularly low costs at the same time.

In one embodiment, an electric warmer for heating a container by means of a heat transfer medium, comprises a jar into which the container can be inserted for heating, and an electric heating device comprising at least one resistance heating element for heating the heat transfer medium. Said warmer further comprises a sensor element for measuring the current flowing through the resistance heating element during operation of the heating device and a control unit, and said control unit is adapted for detecting a characteristic change in the current flowing through the resistance heating element due to a change in the state of aggregation of the medium to be heated, and for controlling power supply to the resistance heating element in response to the state of aggregation of the medium to be heated. Said characteristic change in the current comprises an abrupt decrease of the current.

In a further embodiment, an electric heating device comprises a resistance heating element which has a temperature-dependent resistance and can be contacted thermally with a medium to be heated, wherein a sensor element is provided for measuring the current flowing through the resistance heating element during operation of the heating device. The heating device further comprises a control unit which is adapted for detecting an abrupt decrease in the current flowing through the resistance heating element due to a change in the state of aggregation of the medium to be heated, and for controlling power supply to the resistance heating element in response to the state of aggregation of the medium to be heated.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention which is illustrated in the accompanying drawings, wherein.

DETAILED DESCRIPTION OF THE INVENTION

The illustrated embodiments of the present invention will be described with reference to the figure drawings wherein like elements and structures are indicated by like reference numbers.

Figure 1:
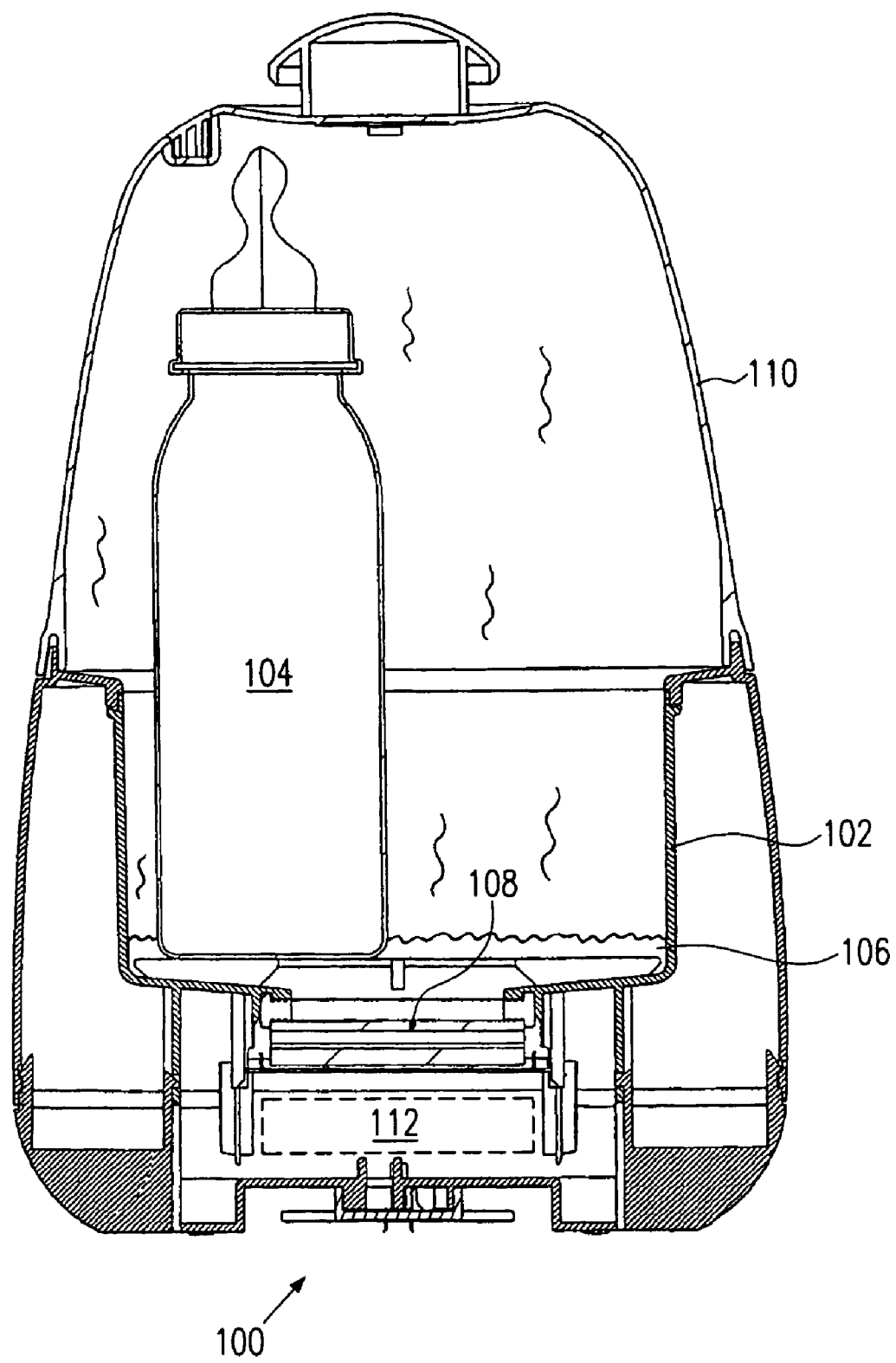
FIG. 1 is a section through an electric sterilizer with inserted container in the operative state.

Referring now to the drawings and in particular to FIG. 1, a schematic illustration of an electric sterilizer 100 is shown in the operative state with an inserted baby bottle. The electric warmer comprises a jar 102 into which the container 104 to be heated, here e.g. a baby bottle, can be inserted. The jar 102 is filled with the heat transfer medium 106, here water, and a PTC resistor heating element 108 which is in thermal contact with water 106 can be fed with electrical energy for heating up the water. When the PTC resistor heating element 108 is heated, water 106 will heat up and start to evaporate.

To produce a closed vapor atmosphere for sterilizing the container 104, the jar is closed with a cover 110. Power supply is controlled with the help of the schematically outlined control unit 112. As shall be explained in more detail in the following with reference to FIG. 3, a sudden or abrupt decrease will be observed in the time curve of the current through the PTC resistor heating element 108 when the whole water 106 has passed over into the vapor phase.

It is adequate for most applications to adjust the power supply as soon as the whole water amount has evaporated because the vapor in the closed vapor chamber formed by the jar 102 and the cover 110 is kept at the desired high temperature level for a sufficiently long period of time.

Figure 2:
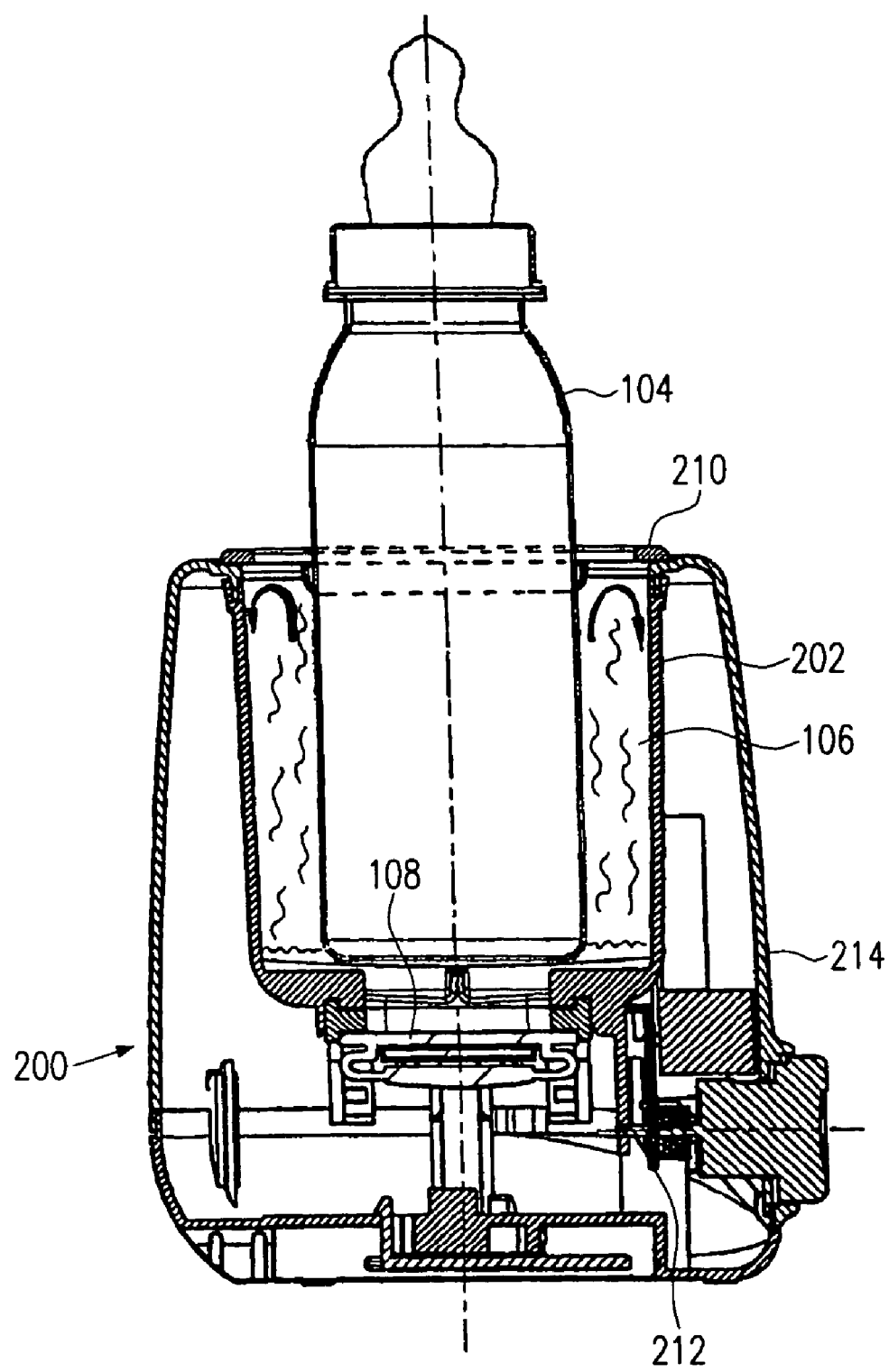
FIG. 2 is a section through an electric baby-food warmer with inserted baby bottle in the operative state.

A further possible embodiment of the electric warmer of the invention is shown in FIG. 2. As can be seen in FIG. 2, the baby food warmer 200 comprises a jar 202 into which a container 104 is inserted for heating baby food, here a baby's feeder. The PTC resistor heating element 108 is in communication with the heat transfer medium 106, here water again, in such a manner that it will be heated upon supply of electrical power. The jar 202, the PTC resistor heating element 108 and the control unit 212 are accommodated in the housing 214, which is preferably made from plastics. The baby food warmer 200 shown in FIG. 2 further comprises a cover 210 which has an annular shape in the illustrated embodiment and covers the space between jar 202 and container 104 towards the surroundings in such a manner that a substantially closed chamber is formed for retaining the water vapor. To heat the contents of the baby bottle 104, a small amount of water is filled in before the cover 110 is attached and the baby bottle 104 is inserted. After the cover 110 has been placed and the baby bottle 104 has been inserted, electrical power can be supplied via the PTC resistor heating element 108, and the water 106 contained in the bottom area of the jar 202 quickly starts to boil and to pass over into water vapor. The hollow space formed by the cover 210, the jar's inner walls and the outer walls of the baby bottle 104 is filled in this manner with water vapor under atmospheric pressure. As water has excellent heat transfer properties, the majority of the energy stored in the water vapor is conveyed to the baby bottle 104 and the baby food contained therein is heated. According to the invention the electrical power supply can already be switched off when the whole water 106 has passed over into water vapor. To this end, as will be explained in more detail in the following with reference to FIGS. 3 and 4, the current which flows through the PTC resistor heating element 108 is monitored and the heating power will be switched off as soon as said current indicates that the whole water has passed over into water vapor.

Although a commercially available baby's feeder is shown in FIGS. 1 and 2 as the container 104, naturally, any other container 104 can also be inserted into the electric warmers 100, 200.

Figure 3:
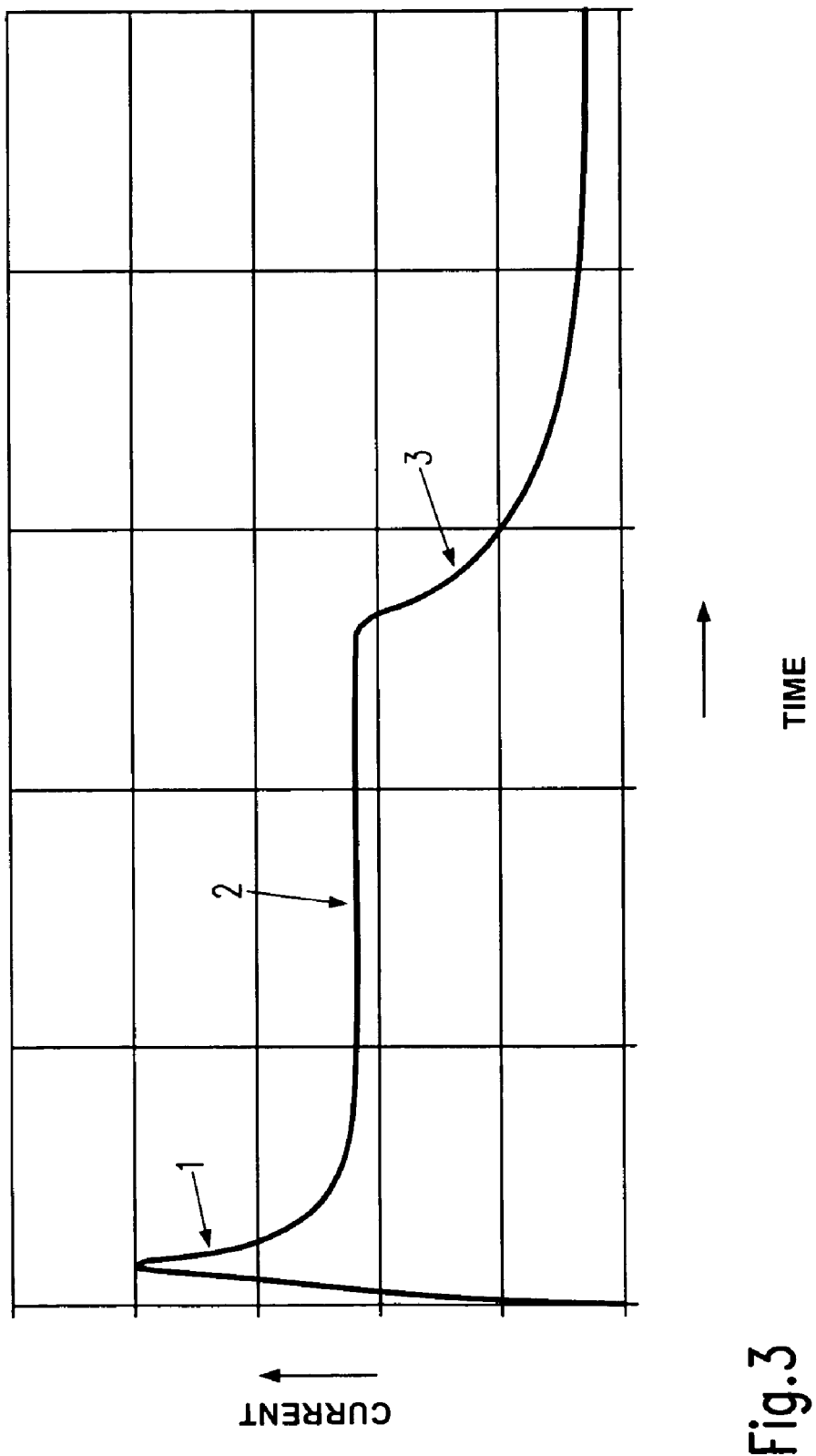
FIG. 3 illustrates the time curve of the current through a PTC resistor heating element.

With reference to FIG. 3, the basic idea of the inventive solution regarding a current monitoring operation of a resistance heating element 108 shall now be explained in more detail. FIG. 3 shows the time curve of the current through a PTC heating element which is in contact with water. After the apparatus has been switched on, a voltage peak 1 can first be made out, i.e., the switch-on current which will flow until a thermally stationary state is reached and the minimum resistance $R_{min}$ of the PTC resistor heating element has been passed through. Subsequently, a thermally stationary state is reached (symbolized by reference numeral 2) in which the water boils and passes more and more into the vapor phase. Said stationary state is reflected by a constant current flow through the PTC heating element. At the moment when the whole amount of water has evaporated, the temperature across the heater rises and due to the beginning PTC effect the power consumption decreases and thus the current flow through the PTC heating element declines exponentially. With a suitable configuration of the heating element, the sudden decrease in current as illustrated by reference numeral 3 can be used as information about the whole conversion of water into the vaporous state of aggregation.

Figure 4:
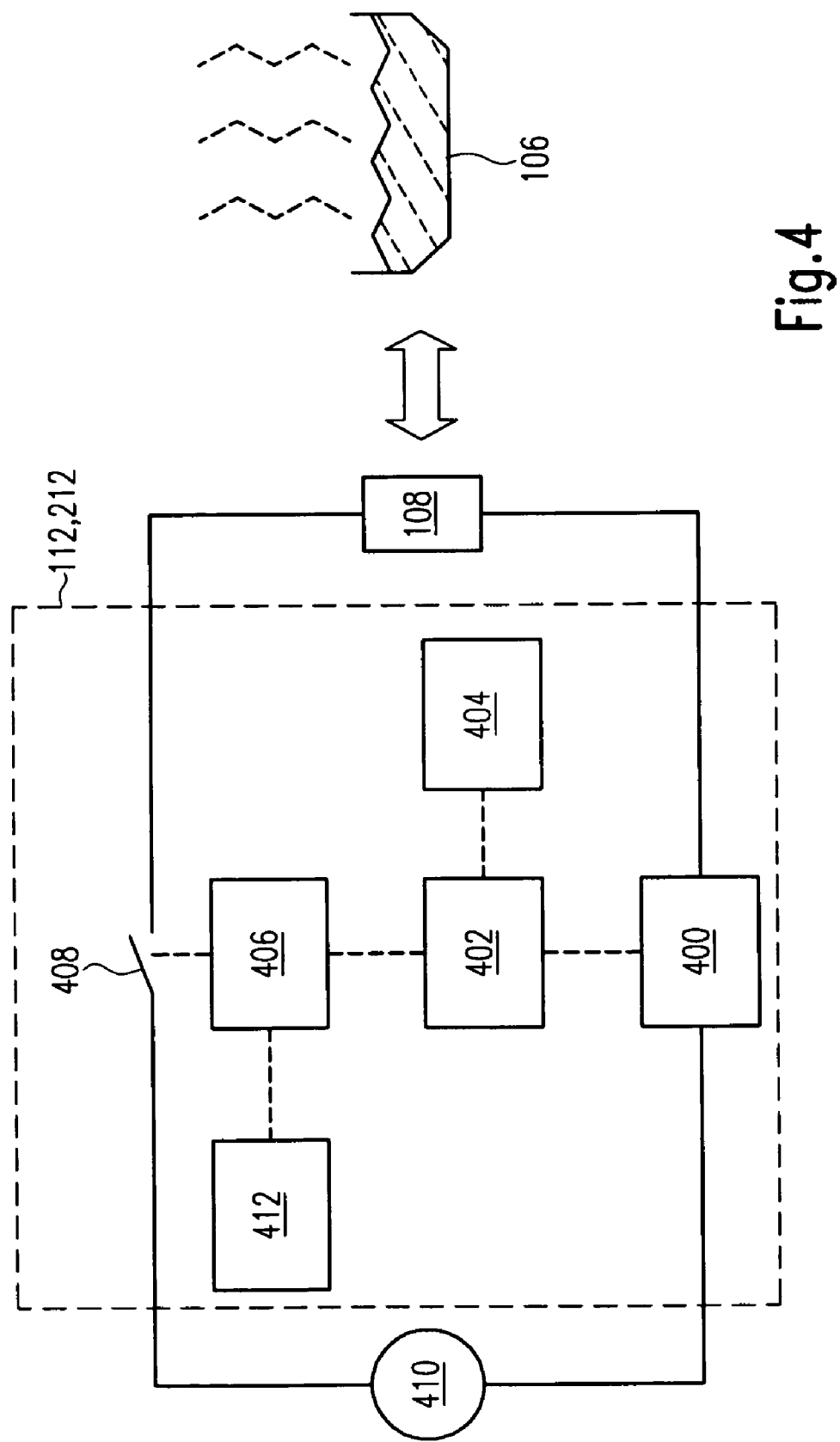
FIG. 4 is a schematic illustration of the electric heating device for an electric warmer of the invention according to a possible embodiment.

As shown in FIG. 4, the control unit 112, 212 includes a current sensor 400 which is connected in series with heating element 108. The heating element 108 is in direct thermal contact with the heat transfer medium 106 and, during operation, has a current curve over time which according to the invention is measured by a current sensor 400. A comparator 402 compares the measured current value with a fixedly programmed or adjustable reference 404. An evaluation logic 406 controls a power switch 408 in dependence upon the comparator signal and in dependence upon a start signal. The power switch establishes the connection of an external voltage supply 410 with the heating element 108. A start signal transmitter 412 may be provided for starting the evaluation logic 406.

With the help of the current monitoring process according to the invention it is possible to switch off the supplied heating power directly after transition of the state of aggregation, thereby limiting unnecessary power consumption.

The present invention is based on the finding that in a generic electric warmer the flow of current through the resistance element is influenced by the state of aggregation of the heat transfer medium which is in direct thermal contact with the resistance heating element. When a sensor is provided for measuring the current flowing through the resistance heating element during operation of the heating device, said current can be used for determining when the heat transfer medium has passed over into the vapor phase and when, therefore, the power supply can be switched off. Especially with a sterilizer, it is possible to exactly determine the point of time from which the sterilization material is actually surrounded by the desired amount of water vapor. The solution according to the invention offers the advantage that the electrical power supply can be interrupted immediately in response to the measured current after the intended change in the state of aggregation has fully taken place, and energy and time can therefore be saved.

According to an advantageous development of the present invention, a resistor with a positive temperature coefficient, a so-called PTC resistor, is used as the resistance heating element. Such PTC resistors offer the advantage that a high initial power can be supplied at low temperatures and that a self-regulating power behavior is observed with an increasing temperature. A PTC resistor comprises, for instance, a PTC ceramic made from doped polycrystalline ceramic based on barium titanate in a sintering method. Within the range of a reference temperature which is pre-dimensioned for the respective module, the so-called control temperature, the resistance value of the PTC resistor changes from a low-resistance to a high-resistance behavior, thus rising suddenly by several powers of ten. Therefore, with a corresponding selection of the reference temperature, the transition of the heat transfer medium into the vapor phase can raise the temperature on the PTC resistor through the control temperature such that the change in the state of aggregation leads to a sudden decrease in the current flowing through the PTC resistor. According to the present invention, the current sensor therefore measures an abrupt decrease in current as a characteristic change in current.

Advantageously, the information supplied by the current flowing through the resistance heating element can be exploited for power control when the control unit of the electric warmer comprises a comparator which compares the measured current with a reference value. The achievement of this reference value can then be used as a signal for switching off power. In the case of a required long-lasting heating operation, as may be the case with sterilizers, it is also possible to detect when the condensing heat transfer medium has deposited again to an inadmissibly high extent in that e.g. the resistance heating element is energized for a short period of time and the current flowing through same is monitored by the control unit.

Furthermore, it can be determined by way of a time reference whether a heat transfer medium amount has been filled in that is too small and whether the user can be warned accordingly that the heating process has not taken place as intended.

Furthermore, the dynamics of the current through the resistance heating element can be monitored. The sudden decrease in the current can here be detected by differentiating the measured current value by means of a differentiator provided in the control device. This solution offers the advantage of a shortened detection time and a low sensitivity to short-time changes in the current due to tolerances, temperature influences or voltage changes. In this embodiment, however, it should be ensured that either the decrease in current after the switch-on current peak is disregarded, or the PTC heater is dimensioned such that it has a sufficiently low switch-on current.

Furthermore, a monitoring of the current through the resistance heating element in a generic electric warmer offers the advantage that errors occurring during electrical contacting can be detected early.

The inventive detection and monitoring of the current through a resistance heating element which is in thermal contact with a medium to be heated can of course also be used in other fields of application for monitoring the state of aggregation of a medium to be heated and for adjusting the heating power in accordance with the sensed state of aggregation.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

In particular, although the present invention has been explained in connection with sterilizers and baby food warmers, naturally, it can also be used for other heating applications in which a conversion of a state of aggregation, e.g. vaporization of water, takes place. Furthermore, the heating element need not be a PTC resistor heating element. Other resistance heating elements also show typical current curves containing information on a phase transition in the medium to be heated.

In addition, those areas in which it is believed that those ordinary skilled in the art are familiar have not been described herein in order not to unnecessarily obscure the invention described herein.

Accordingly, it is to be understood that the invention is not to be limited by the specific illustrated embodiments but only by the scope of the appended claims.

What is claimed is:

1. An electric warmer for heating a container by means of a heat transfer medium, said warmer comprising a jar into which the container can be inserted for heating, and an electric heating device comprising at least one resistance heating element for heating the heat transfer medium,
wherein said warmer comprises a sensor element for measuring the current flowing through the resistance heating element during operation of the heating device and a control unit,
wherein said control unit is adapted for detecting a characteristic change in the current flowing through the resistance heating element due to a change in the state of aggregation of the medium to be heated, and for controlling power supply to the resistance heating element in response to the state of aggregation of the medium to be heated, and
wherein said characteristic change in the current comprises an abrupt decrease of the current.

2. The electric warmer according to claim 1, wherein the heat transfer medium is water and the characteristic change in current is due to the transition of water into the vapor phase.

3. The electric warmer according to claim 1, wherein the resistance heating element is formed by at least one resistor having a positive temperature coefficient.

4. The electric warmer according to claim 1, wherein the control unit comprises a comparator for comparing the measured current with a reference value.

5. The electric warmer according to claim 4, further comprising a power switch which is connected to the control unit to be operated in response to an output signal of the comparator.

6. The electric warmer according to claim 1, wherein the control unit comprises a differentiator for determining a rise in the current curve over time.

7. The electric warmer according to claim 1, wherein the jar together with a cover forms a substantially closed chamber for retaining the vaporous heat transfer medium.

8. An electric heating device comprising a resistance heating element which has a temperature-dependent resistance and can be contacted thermally with a medium to be heated,
wherein a sensor element is provided for measuring the current flowing through the resistance heating element during operation of the heating device,
further comprising a control unit which is adapted for detecting an abrupt decrease in the current flowing through the resistance heating element due to a change in the state of aggregation of the medium to be heated, and for controlling power supply to the resistance heating element in response to the state of aggregation of the medium to be heated.

9. The electric heating device according to claim 8, wherein the resistance heating element is formed by at least one resistor having a positive temperature coefficient.

10. The electric heating device according to claim 8, wherein the control unit comprises a comparator for comparing the measured current with a reference value.

11. The electric heating device according to claim 10, further comprising a power switch which is connected to the control unit to be operated in response to an output signal of the comparator.

12. The electric heating device according to claim 8, wherein the control unit comprises a differentiator for determining a rise in the current curve over time.

* * * * *